United States Patent [19]
Hagiwara et al.

[11] 3,805,985
[45] Apr. 23, 1974

[54] RESIN COATED GLASS ARTICLE HAVING IMPROVED ANTI-SHOCK DURABILITY

[75] Inventors: Kazuo Hagiwara, Tokyo; Yoshiaki Seki, Yokohama; Mitsutsugu Masuda, Narashino; Hiroshi Gotoh, Yokohama, all of Japan

[73] Assignees: Mitsui Polychemical Co., Ltd.; Tokyo Printing Inc. Mfg. Co. Ltd., both of Tokyo, Japan; part interest to each

[22] Filed: Sept. 30, 1971

[21] Appl. No.: 185,443

[30] Foreign Application Priority Data
Oct. 1, 1970    Japan .................. 45-85528

[52] U.S. Cl. ............. 215/12 R, 117/94, 117/124 E, 117/17, 117/18, 117/21, 117/161 UC, 117/161 UH, 215/1 C, 215/DIG. 6, 260/78.4 D, 260/87.3, 260/878 R
[51] Int. Cl. ................... B65d 11/16, B32b 17/10
[58] Field of Search... 117/124 E, 161 UH, 161 UC, 117/94; 260/78.4 D, 87.3, 878 R; 215/DIG. 6, 1 C, 12 R

[56] References Cited
UNITED STATES PATENTS

| | | | |
|---|---|---|---|
| 2,703,794 | 3/1955 | Roedel | 260/87.3 |
| 3,548,408 | 11/1970 | Worrall | 260/87.3 |
| 3,111,500 | 11/1963 | Bartl et al. | 260/878 R |
| 3,177,269 | 4/1965 | Nowak et al. | 260/878 R |
| 3,554,787 | 1/1971 | Plymale | 117/124 E |
| 3,558,345 | 1/1971 | Baum et al. | 117/124 F |

*Primary Examiner*—William D. Martin
*Assistant Examiner*—William H. Schmidt
*Attorney, Agent, or Firm*—Sherman and Shalloway

[57] ABSTRACT

A coated glass article having a coated layer directly adhering to a surface of the glass article, in which the coated layer is formed by a resin selected from the group consisting of (1) a hydrolyzed copolymer of an ethylene/vinyl acetate copolymer; (2) a partially esterified copolymer obtained by esterifying 1–15 percent of the hydroxyl groups of the hydrolyzed copolymer with a dicarboxylic acid, or a metal salt of the copolymer; and a graft copolymer obtained by grafting 1–5 percent of a graft copolymerizable acid monomer having carboxyl groups in its molecule to the hydrolyzed copolymer (1) or the partially esterified copolymer (2), or a metal salt of the graft copolymer.

Prior to coating with the resin, the glass article may be treated with a surface active agent such as an aminosilane or a methacryloxysilane.

The resin coating may be applied by conventional powder coating methods such as the fluidized bed methods or electrostatic coating methods.

2 Claims, No Drawings

RESIN COATED GLASS ARTICLE HAVING IMPROVED ANTI-SHOCK DURABILITY

This invention relates to a coated glass article having a resin coated layer which has an improved antishock durability with its break resistance and ability to prevent the scattering of glass fragments in the event of breakage, and to an improved method of imparting such properties to a glass article.

More specifically, the invention relates to a coated glass article having a coated layer directly adhering to a surface of said glass article, in which the coated layer is formed by a resin selected from the group consisting of:

1. a hydrolyzed copolymer of an ethylene/vinyl acetate copolymer obtained by hydrolyzing at least 80 percent of the acetoxy groups of an ethylene/vinyl acetate copolymer having 28 – 45 percent of a unit derived from vinyl acetate, to hydroxyl groups;
2. a partially esterified copolymer obtained by esterifying 1 – 15 percent of the hydroxyl groups of such hydrolyzed copolymer with a dicarboxylic acid, or a metal salt of such copolymer obtained by replacing the hydrogen atoms of carboxyl groups of the esterified copolymer by a metal atom; and
3. a graft copolymer obtained by grafting 1 – 5 percent of a graft copolymerizable acid monomer having carboxyl groups in its molecule to hydrolyzed copolymer (1) or partially esterfied copolymer (2), or a metal salt of the graft copolymer obtained by replacing the hydrogen atoms of carboxyl groups of the graft copolymer, and a process for producing such an article.

Glass is superior to plastics in transparency and resistance to chemicals and has other characteristic properties. In addition to this, it is available at relatively low cost, and these advantages render it widely applicable as bottles and other containers. It is well known, however, that glass is weak against impact and upon breakage the fragments of the glass are scattered about to cause danger.

Attempts to impart anti-shock durability to glass have been made in order to remove such defects, and resulted, for example, in a strengthened glass sheet that has been rendered stronger against external forces and temperature changes by heat-treatment, a safety glass having an interlayer of a resin, or a strengthened glass sheet having an interlayer of a wire gauze.

Such glass sheets are not suitable for making bottles, jars, and other containers, and are costly. Therefore, a method has been employed to prevent the occurrence of injury on the surface of glass bottle owing to collision or rubbing by coating a silicone oil or the like on the surface. The effect obtained is however small, and once the glass has been broken, a danger of scattering of glass fragments cannot be prevented. It has also been proposed to coat the surface of a glass bottle with a solution of a certain resin. But the coated resin layer cannot have sufficient thickness, and the desired anti-shock durability and scatter preventing property cannot be obtained with satisfaction. Furthermore, there are adverse effects of the residual solvent on the properties of coated films. This especially poses a problem in the case of bottles for foodstuffs due to its smell and hygienic problem. Disadvantages such as air pollution or offensive smell of the solvent also arise during the coating operation.

In an attempt to avoid these problems, a method has also been used to coat the glass containers with a film of a resin such as an acrylonitrile type resin. This is however a temporary measure taken, for instance, during transportation, and the adhesiveness is poor. Such a method, therefore, does not produce the effect of scatter prevention, and the film cannot withstand use for prolonged periods of time. Methods of improving the adhesion of films to glass have been proposed, but have not proved effective for polyolefin films having good resistance to chemicals and good pliability and toughness.

Since glass articles have excellent resistance to chemicals, they are cleansed with a strongly alkaline aqueous solution prior to use. The synthetic resin films used by the conventional technique are either attacked by the strongly alkaline aqueous solution or peeled off from the surface of glass. These resin films cannot be applied to such bottles as beer bottles which are repeatedly used after cleansing under severe conditions.

Glass articles such as beer or carbonated beverage bottles which are repeatedly used require break resistance and scatter preventing property more than other glass articles.

A proposal has been known to provide a glass article having a dual scratch and abrasion resistant coating by forming a first layer of a pyrolyzable tin or titanium compound on the surface of a hot glass article, converting the compound to its oxide on the surface, and overcoating this first layer with an organic material comprising a label accepting copolymer of about 14 to 30 percent vinyl acetate with 70 to 86 percent ethylene (U. S. Pat. No. 3,554,787). In this proposal, other copolymers containing ethylene are illustrated as examples of the organic material, and a copolymer of ethylene with ethyl acrylate containing from about 10 to about 40 percent ester is specifically mentioned. This proposal, however, is quite silent on the usability of a hydrolyzed product of an ethylene/vinyl acetate copolymer, a partially esterified product of the hydrolyzed product, or a graft copolymer of the partially esterified product. As will be described later by comparative examples, the improvement intended by the present invention cannot be achieved by using a non-hydrolyzed ethylene/vinyl acetate copolymer or an ethylene/ethyl acrylate copolymer instead of the hydrolyzed copolymer. It has also been found that the improvement intended by the present invention cannot be achieved even if a graft copolymer obtained by grafting an ester of an acid monomer to the hydrolyzed copolymer, or a graft copolymer obtained by grafting an acid monomer to a non-hydrolyzed ethylene/vinyl acetate copolymer is used instead of the graft copolymer specified in the present invention.

It has now been found that glass articles which can withstand repeated rinsings with a strongly alkaline aqueous solution, and retain high degrees of anti-shock durability and scatter preventing property can be provided without the use of the first layer of the oxide of a pyrolyzable tin or titanium compound as mentioned in the above U. S. patent. The glass articles having excellent anti-shock durability can be produced at low cost by easy operation when the above-described specific resin is used in accordance with the present invention.

It is therefore an object of the present invention to provide a coated glass article having a coated layer directly adhering to a surface of the glass article which has excellent anti-shock durability.

A second object of the present invention is to provide a method of increasing the anti-shock durability of a glass article.

Many other objects and advantages of the present invention will become apparent from the following description.

In the present invention the above resins (1), (2) and (3) may be used either alone or in admixture of two or more.

The specific resin used in the present invention can be produced by any known technique, and this will be described only briefly below.

The hydrolyzed copolymer (1) is obtained, for example, by heating a solution in xylene of an ethylene/vinyl acetate copolymer containing a unit derived from vinyl acetate in an amount of 28 – 45 percent by weight, preferably above 30 percent by weight, but below 45 percent by weight, with addition of an alkali metal alcoholate or an alkali hydroxide, to thereby convert at least 80 percent of the acetoxy groups of the copolymer to hydroxyl groups.

If the amount of vinyl acetate in the copolymer of the ethylene/vinyl acetate copolymer is below 28 percent, the resulting resin coating is low in transparency and its commercial value is reduced. On the other hand, if the amount is above 45 percent by weight, the resulting hydrolyzed product obtained from the ethylene/vinyl acetate copolymer or derivatives of the hydrolyzed product has a low viscosity at the time of melting, and longer periods of time are required for coating the resin on bottles. In addition, the resin coating on bottles is brittle, and has poor shock resistance.

The hydrolysis is performed until at least 80 percent of the acetoxy groups of the copolymer are converted to hydroxyl groups. If the degree of hydrolysis is less than 80 percent, the chemical resistance of the resin is insufficient because of a large amount of the remaining acetoxy groups.

The partially esterified product (2) can be obtained, for example, by dissolving the hydrolyzed copolymer (1) obtained above in an aromatic solvent, and reacting it with a predetermined amount of a dicarboxylic acid using pyridine as a catalyst at about 80 °C. for about 70 hours. After completion of the reaction, the product was poured in a large quantity of methanol to precipitate the esterfied product in which 1 – 15 percent of the hydroxyl groups of the copolymer (1) have been esterified. The metal salt of this copolymer can be obtained by dissolving the copolymer in an aromatic solvent, and reacting the solution with an alkali hydroxide, for instance, in the form of a mixed solution of the alkali hydroxide and methanol, under heating.

Examples of the dicarboxylic acid used in the above esterification include aliphatic dicarboxylic acids having 2 to 10 carbon atoms (the carbon atoms of the carboxyl groups being excluded), such as succinic acid, glutaric acid, adipic acid, citraconic acid, itaconic acid, glutaconic acid and aconitic acid, and the anhydrides of these acids; and aromatic dicarboxylic acids having 6 to 20 carbon atoms (the carbon atoms of the carboxyl groups being excluded), such as phthalic acid, naphthalic acid, and the anhydrides of these acids. The anhydrides of the aliphatic and aromatic dicarboxylic acids are especially preferred.

As the metal atom which replaces the hydrogen atom of the carboxyl group, sodium, zinc, or aluminum can be exemplified.

The graft copolymer (3) can be obtained by graft copolymerizing the copolymer (1) or (2) with 1 – 5 percent by weight, preferably 1 –2 percent by weight, of an acid monomer having carboxyl groups in its molecule in a manner known per se. For example, it can be obtained by the following procedure. One hundred parts of the copolymer (1) or (2) are dissolved in 200 parts of xylene, and 4 parts of acrylic acid, and 0.4 part of benzoyl peroxide were added to the solution. The reaction was performed for 2 hours at 120°C. After completion of the reaction, the reaction product was allowed to cool, and then poured in a large quentity of methanol to precipitate the polymer. The polymer was then filtered, washed, and dried.

The metal salt of the graft copolymer in which the hydrogen atoms of the carboxyl group are replaced by a metal atom can be obtained, for example, by the same method as in the preparation of the metal salt (2) of the partially esterified copolymer.

Examples of the acid monomer include unsaturated monocarboxylic acids having 3 to 10 carbon atoms such as acrylic or methacrylic acid, and unsaturated dicarboxylic acids having 4 to 10 carbon atoms such as maleic acid, fumaric acid, or itaconic acid. Examples of the metal atom have been mentioned above with respect to the metal salt (2) of the copolymer.

The use of the above-described resin in the form of a metal salt serves to improve the adhesion between the surface of a glass article and the coated resin layer.

The proportions of the comonomers, the intromolecular hydroxyl groups, carboxyl groups, or acetoxy groups, and the types of the copolymer may be selected as desired according to the properties required of the glass article on which the above resin is coated.

The formation of a coated layer directly adhering to a surface of the glass article using the above-described resin is performed by the dry coating process without using the wet process in which the resin is applied as a solvent solution.

As such dry process, any known procedures can be utilized.

Examples of the dry process include a powder fluidization coating method in which the powders of the resin are fluidized in a fluidizing tank using a fluidizing gas, and a glass bottle heated to a temperature above the softening point of the resin is immersed in the powders to thereby adhere the resin powders to the surface of the glass bottle; and electrostatic coating method in which the powders of the resin are adhered to the surface of the glass bottle by electrostatic force, and then the bottle is heated to a temperature above the softening point of the resin; or a method in which the copolymer is closely coated on the surface of the bottle by a known process such as the vacuum packing process, skin packing process or blister packing process, and then the bottle is heated to effect adhesion between the surface of the glass bottle and the resin. If desired, the bottle may be further heated after coating to a temperature above the softening point of the copolymer resin to increase the smoothness of the surface.

Since according to the invention, the polar groups in the molecules of the resin used are oriented towards the surface of the glass and adhere strongly thereto, the bond strength is high, and the resin layer is not at all peeled off even under very severe conditions in the cleansing of bottles.

Before coating by the dry coating process, the surface of glass article is preferably cleansed with a suitable cleansing agent, and allowed to dry. Examples of such cleansing agent include halogenated hydrocarbons such as trichloroethylene or perchloroethy-lene.

Adhesion between the bottle and the resin can be further increased if after the cleansing of the bottle, it is treated with a surface active agent of the silicon type such as γ-aminopropyltriethoxysilane [NH$_2$(CH$_2$)$_3$Si(OC$_2$H$_5$)$_3$] or γ-methacryl-oxypropyltrimethoxysilane

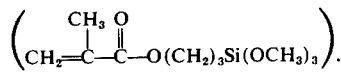

The copolymer coating used in the present invention is generally transparent, and has superior chemical resistance, water proofness and toughness, and moderate pliability same as polyolefin films. Therefore, glass coated with it is completely prevented from scattering of glass fragments in the event of breakage since the film is firmly adhered to the glass surface.

If copolymers of the above description which have high transparency are chosen, the resulting coated glass is quite the same in appearance as non-treated glass, and therefore, the characteristics of the glass are not at all impaired. In repeated use for prolonged periods of time, the coated layer can be re-melted by heating it to a temperature above the softening point of the resin to smoothen it.

Although the present invention produces best results when applied to the coating of glass bottles or other containers which are subjected to repeated use, it can be applied with good results to glass articles in general.

The following examples are merely illustrative of the mode and manner of carrying out the present invention and should not be considered limiting in scope in any way.

In the following examples and comparative examples, the anti-shock durability of the glass article was determined by the break test described below.

A. Break Test:

a. Ten test bottles were produced each by coating the resin on a glass bottle in a thickness of 0.15 mm so that the coated layer adhered directly to an exterior surface of the bottle.

Each of the test bottles was fixed to a wooden stand with two rubber bands secured to the stand, at the neck and body of the bottle. Water was introduced under pressure through an inlet cap secured to the mouth of the bottle, and the inner pressure of the bottle was adjusted to 2 Kg/cm$^2$ gauge. A steel rod having a diameter of 1 cm and a weight of 400 g was allowed to fall from the height of 2.5 cm onto the bottle to break it forcibly. The distance between the original position of the bottle to the glass fragment farthest scattered was measured. This was repeated 50 times, and the mean value of the distances measured was calculated.

b. The same test bottles as those used in the above-mentioned test were cleansed with an alkali cleansing agent, and thereafter, immersed for one hour in a 4 percent aqueous solution of sodium hydroxide at 70°C, followed by washing with water. The test was carried out under the same conditions as mentioned above. The results obtained are shown at Table 1 below.

The resin-coated test bottles were prepared by the following procedure.

Glass bottles were defatted with trichloroethy-lene, and heated to 200°C. In an electric oven. The bottles were then treated with each of Samples A to H shown below by the fluidization immersion method for 1.5 seconds, and thereafter, re-heated for 10 minutes at 200°C. The thickness of the adhering film was 0.15 mm.

Sample A

Powders (100 – 150 mesh) of a thermoplastic resin having a specific gravity of 0.97, a softening point of 90°C., and a melt index of 20 g/10 minutes obtained by hydrolyzing an ethylene/vinyl acetate copolymer having a vinyl acetate content of 35 percent by weight to convert 90 percent of the acetoxy groups in the molecule to hydroxyl groups.

Sample B

Powders (100 – 150 mesh) of an olefin copolymer having a softening point of 70°C. and a melt index of 66 g/10 minutes obtained by hydrolyzing a copolymer of ethylene/vinyl acetate having a vinyl acetate content of 28 percent to convert 90 percent of the acetoxy groups in the molecule to hydroxyl groups, and grafting 2 percent by weight of acrylic acid thereto.

Sample C

Powders (100 – 150 mesh) of an olefin copolymer having a softening point of 720 and a melt index of 156 b/10 minutes obtained by hydrolyzing 90 percent of the acetoxy groups of an ethylene/vinyl acetate containing 28 percent vinyl acetate to hydroxyl groups, and reacting 10 percent, based on the resulting hydroxyl groups, of hydroxyl groups with phthalic acid to form a half ester of the copolymer with the dicarboxylic acid.

Sample D

Resin obtained by reacting a xylene solution of the resin designated as Sample C with a mixed solution of 0.1N sodium hydroxide and methanol at 85°C.

Sample E

Ethylene/vinyl acetate copolymer having 28 percent of vinyl acetate content.

Sample F

Resin obtained by hydrolyzing an ethylene/vinyl acetate copolymer having a vinyl acetate content of 28 percent to convert 90 percent of the acetoxy groups in the molecules to hydroxyl groups, and grafting 2 percent by weight of methyl acrylate thereto.

Sample G

Resin obtained by grafting 2 percent by weight of acrylic acid to a non-hydrolyzed ethylene/vinyl acetate copolymer having a vinyl acetate content of 28 percent.

Sample H

Powders (50 to 100 mesh) of low density polyethylene having a density of 0.916, a melt index of 70 G/10 minutes, and a softening point of 84°C.

TABLE 1

| Resin-coated bottles | | a. Anti-shock durability before alkali cleansing (meters) | b. Anti-shock durability after alkali cleansing (meters) |
|---|---|---|---|
| Example 1 | Sample A | 2.0 | 1.8 |
| Example 2 | Sample B | 3.4 | 3.6 |
| Example 3 | Sample C | 3.0 | 3.3 |
| Example 4 | Sample D | 4.2 | 4.6 |
| Comparative Example 1 | Smple E | 7.0 | 9.5 |
| Comparative Example 2 | Sample F | 4.4 | 6.1 |
| Comparative Example 3 | Sample G | 5.6 | 7.3 |
| Comparative Example 4 | Sample H | 9.8 | 10.1 |
| Comparative Example 5 | no coating | 12.6 | — |

The alkali-resistance of the coated layer was determined as follows:

B. Alkali-Resistance Test on Resin-Coated Glass Bottles:

The resin-coated layer of the same test bottles was cut at three places along the circumference of the bottle. The cuts reached the surface of the glass, and the distance between two adjacent cuts was 80 mm. Thereafter, the bottles were immersed for one hour in a 4 percent aqueous solution of sodium hydroxide at 70°C., and washed with water. The changes on the surface of the resin layer were observed. The largest length of the coated layer stripped off from the resin layer beginning at the cuts was measured. The peel-off angle was normal to the cuts. This was repeated 10 times, and the mean value was calculated. The results are given in Table II.

TABLE II

| Resin-coated bottles | | Surface condition of the resin layer | Peel-off length of the resin coat (mm) |
|---|---|---|---|
| Example 1 | Sample A | Hardly any change | 1.0 |
| Example 2 | Sample B | Hardly any change | 0.5 |
| Example 3 | Sample C | Strip-off occurred here and there along the cuts | 5.0 |
| Example 4 | Sample D | Strip-off occurred here and there along the cuts | 4.5 |
| Comparative Example 1 | Sample E | Continuous strip-off occurred along the cuts | 30.0 |
| Comparative Example 2 | Sample F | Continuous strip-off occurred along the cuts | 1.0 |
| Comparative Example 3 | Sample G | The coated layer was broken to pieces, and adhered to one another | 80.0 |
| Comparative Example 4 | Sample H | Peel-off occurred throughout the coated layer | 80.0 |

What we claim is:

1. A coated glass bottle or jar having a synthetic resin-coated layer directly adhering to a surface of said glass article, characterized in that the coated layer is formed by a resin selected from the group consisting of:

a. a partially esterified copolymer obtained by esterifying 1–15 percent of the hydroxyl groups of a hydrolyzed copolymer of an ethylene/vinyl acetate copolymer obtained by hydrolyzing to hydroxyl groups at least 80 percent of the acetoxy groups of an ethylene/vinyl acetate copolymer having 28–45 percent of units derived from vinyl acetate with a dicarboxylic acid selected from aliphatic dicarboxylic acids of 2 – 10 carbon atoms excluding carbon atoms of the carboxyl groups, aromatic dicarboxylic acids of 6 – 20 carbon atoms excluding carbon atoms of the carboxyl groups and acid anhydrides thereof, b. a metal salt of a copolymer obtained by replacing hydrogen atoms of carboxyl groups of esterified copolymer (a) by metal atoms, c. a graft copolymer obtained by grafting 1 – 5 percent of a graft copolymerizable acid monomer having carboxyl groups in its molecule, to the hydrolyzed copolymer of an ethylene/vinyl acetate co-polymer obtained by hydrolyzing to hydroxyl groups at least 80 percent of the acetoxy groups of an ethylene/vinyl acetate copolymer having 28–45 percent of units derived from vinyl acetate, said graft copolymerizable acid monomer being an unsaturated mono-carboxylic acid having 3 to 10 carbon atoms or an unsaturated dicarboxylic acid having 4 to 10 carbon atoms, d. a graft copolymer obtained by grafting 1–5 percent of a graft copolymerizable acid monomer having carboxyl groups in its mole-cule to partially esterified copolymer (a), e. a graft copolymer obtained by grafting 1–5 percent of a graft copolymerizable acid monomer having carboxyl groups in its molecule to the metal salt of copolymer (b), and f. a metal salt of a graft copolymer selected from the group consisting of graft copolymers (c), (d), and (e), obtained by replacing hydrogen atoms of carboxyl groups of the graft copolymer by metal atoms.

2. The coated glass bottle or jar of claim 1 wherein said metal atom is sodium, zinc or aluminum.

* * * * *